(12) United States Patent
Crudele et al.

(10) Patent No.: US 10,565,311 B2
(45) Date of Patent: Feb. 18, 2020

(54) METHOD FOR UPDATING A KNOWLEDGE BASE OF A SENTIMENT ANALYSIS SYSTEM

(71) Applicant: International Business Machines Corporation, Armonk, NY (US)

(72) Inventors: Michele Crudele, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 15/433,717

(22) Filed: Feb. 15, 2017

(65) Prior Publication Data

US 2018/0232359 A1     Aug. 16, 2018

(51) Int. Cl.
*G06F 17/11* (2006.01)
*G06F 17/27* (2006.01)

(52) U.S. Cl.
CPC .............................. *G06F 17/2785* (2013.01)

(58) Field of Classification Search
CPC ... G06F 17/2785; G06F 17/11; G06F 17/2705
USPC ............................................................ 704/9
See application file for complete search history.

(56) References Cited

U.S. PATENT DOCUMENTS

| | | | | |
|---|---|---|---|---|
| 8,725,495 B2* | 5/2014 | Peng | ...................... | G06F 17/274 704/1 |
| 8,935,197 B2* | 1/2015 | Moitra | ................. | G06F 3/04817 706/58 |
| 8,965,835 B2* | 2/2015 | Avner | ................. | G06F 17/2785 705/14.4 |
| 9,275,041 B2* | 3/2016 | Ghosh | ................. | G06F 17/2785 |
| 2010/0312769 A1* | 12/2010 | Bailey | ..................... | G06F 16/95 707/740 |

(Continued)

FOREIGN PATENT DOCUMENTS

WO       WO 2015/030637 A1      3/2015

OTHER PUBLICATIONS

Li, Xinmiao et al., "A Global Optimization Approach to Multi-Polarity Sentiment Analysis", PLoS ONE, http://www.ncbi.nlm.nih.gove/pmc/articles/PMC4409395/, vol. 10, No. 4, Apr. 24, 2015, 18 pages.

(Continued)

*Primary Examiner* — Richemond Dorvil
*Assistant Examiner* — Rodrigo A Chavez
(74) *Attorney, Agent, or Firm* — Francis Lammes; Stephen J. Walder, Jr.; William H. Hartwell (57) ABSTRACT

A mechanism is provided updating a knowledge base of a sentiment analysis system, the knowledge base being operable for storing natural language terms and a score value related to each natural language term, the score value characterizing the sentiment of the natural language term. Messages comprising natural language are received. Using content of the knowledge base, a decision is made as to whether at least one message of the received messages has a positive sentiment or a negative sentiment. A term is extracted from the message that is not present in the knowledge base. Based on a frequency of occurrence of the term in the received messages and the sentiment of the messages in which the term occurs, a score value of the term is calculated, and the term and the calculated score value are stored into the knowledge base.

17 Claims, 3 Drawing Sheets

(56) References Cited

U.S. PATENT DOCUMENTS

2016/0085745 A1* 3/2016 Clark ................ G06F 16/3344
704/9
2017/0277679 A1* 9/2017 Miyabe ................ G06F 17/274

OTHER PUBLICATIONS

Lu, Yue et al., "Automatic Construction of a Context-Aware Sentiment Lexicon: An Optimization Approach", ACM, WWW 2011—Session: Semantic Analysis, Hyderabad, India, Mar. 28-Apr. 1, 2011, pp. 347-356.

Neviarouskaya, Alena et al., "SentiFul: Generating a Reliable Lexicon for Sentiment Analysis", IEEE, 2009 3rd International Conference on Affective Computing and Intelligent Interaction and Workshops, Sep. 10-12, 2009, 6 pages.

* cited by examiner

METHOD FOR UPDATING A KNOWLEDGE BASE OF A SENTIMENT ANALYSIS SYSTEM

BACKGROUND

The present invention relates to the field of digital computer systems, and more specifically, to a method for updating a knowledge base of a sentiment analysis system.

Sentiment analysis is a technique to evaluate people's opinions about topics of interest on the social media (e.g. blogs). Among those social media, those that post microblogs, i.e. short text messages (e.g. Twitter®), are becoming a valuable source which, once analyzed for mining opinions can give actionable insights. For example, the provider of a financial service may discover that a person is complaining about a service on Twitter® using the sentiment analysis, and may thus contact him to place customer retaining actions and to avoid spreading bad words about the service and brand. However, technical issues arise when trying to implement such analysis such that it produces accurate results.

SUMMARY

Various embodiments provide a method for updating a knowledge base of a sentiment analysis system, computer system and computer program product as described by the subject matter of the independent claims. Advantageous embodiments are described in the dependent claims. Embodiments of the present invention can be freely combined with each other if they are not mutually exclusive.

In one illustrative embodiment, a method for updating a knowledge base of a sentiment analysis system, the knowledge base being operable for storing natural language terms and a score value related to each natural language term, the score value characterizing the sentiment of the natural language term is provided. The illustrative embodiment receives messages comprising natural language. The illustrative embodiment decides, using content of the knowledge base, whether at least one message of the received messages has a positive sentiment or a negative sentiment. The illustrative embodiment extracts a term from the message that is not present in the knowledge base. Based on a frequency of occurrence of the term in the received messages and the sentiment of the messages in which the term occurs, the illustrative embodiment calculates a score value of the term. The illustrative embodiment then stores the term and the calculated score value into the knowledge base.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A "sentiment" refers to an attitude, opinion, or judgment of a human with respect to a subject.

Sentiment analysis (or opinion mining) refers to the use of natural language processing, text analysis and computational linguistics to identify and extract subjective information in source data. For example, a sentiment analysis systems may use different approaches, such as a natural language processing (NLP)-based method that analyzes the language using natural language processing tools, a statistical machine learning-based method that uses classifiers (e.g. Bayes classifiers); or a Lexicon based method that uses a lexicon of opinion terms, called opinion lexicon, which contains the set of at least positive and negative terms.

Sentiment analysis aims to determine the attitude of a speaker or a writer with respect to some topic or the overall contextual polarity of a document. The attitude may be his or her judgment or evaluation, the emotional state of the author when writing, or the emotional effect the author wishes to have on the reader.

Sentiment analysis involves identifying each term appearing in the messages and assigning a score to the term, which can be a negative score or positive score to express whether the term is associated with negative sentiment, or positive sentiment.

A "term" refers to a word or a combination of words for which a sentiment can be expressed. As examples, a term can be a noun or compound noun. As other examples, a term can be any other word or combination of words that an analyst wishes to consider, where the word(s) can be a noun, a compound noun, an adjective, a verb, and so forth. Sentiment or opinion words in the messages can also be identified, where sentiment words include individual words or phrases (made up of multiple words) that express an attitude, opinion, or judgment of a human. Examples of sentiment words include "bad," "poor," "great performance," "fast service," and the like.

The present method may enable to automatically identify new terms (terms not present in the knowledge base) that can become of common usage as opinion terms (negative and positive) and to continuously detect them and automatically update the knowledge base accordingly.

For example, monitoring tweets during a new event such as for example the terroristic attack at Bataclan, tweets mentioning Bataclan may be classified as negative based on opinion terms included in the knowledge base (e.g. terrorist, attack, bomb, shot, . . . ). Due to the gravity and popularity of the event, in a future the word Bataclan may become of common usage as indicative of something terrific: e.g. a post like "it has been a bataclan" would probably express a negative opinion about something that would not be detected as the term bataclan is not in the knowledge base. So, detecting Bataclan and adding to the knowledge base, may improve the accuracy of a sentiment analysis system.

By regularly updating the knowledge base, the present method may enable an efficient identification of malicious attackers or users that exchange messages e.g. using a public social media.

The present method may take into account the aspect related to the trained knowledge base which is the vertiginous evolution of the spoken languages used on the Internet, which makes difficult to keep it up to date for mining new idioms, neologisms, abbreviations, acronyms. This may prevent an ad-hoc re-training sentiment analysis system with new training datasets which is a long process.

The present method may keep up to date the knowledge base e.g. of a "lexicon based sentiment system" by automatically identifying new opinion terms.

For example, the method (e.g. the deciding, extracting, calculating and storing steps) may be performed for each message of the received messages. In another example, the method may be performed on a predefined part of the received messages. For example, only messages that originated from a given location and/or at a given time period may be processed by the present method. In another example, only messages of a specific language may be processed. This selective processing of messages may be advantageous as it may for example avoid processing redundant messages (e.g. messages that are regularly submitted) or processing irrelevant messages.

The messages may for example be received at a predefined time period. Upon performing the present method on each of the received messages, other messages may be received in another time period and may be processed using the present method.

According to one embodiment, the method further comprises: classifying the received messages into a positive set of messages having a positive sentiment and a negative set of messages having a negative sentiment, wherein the term is extracted from the message of one of the positive and the negative sets, wherein the frequency of occurrence is the fraction of messages of the one of the positive and negative sets that contain the term.

For example, the decision whether a message of the received messages has a positive or a negative sentiment may be performed using the classified messages e.g. if the message is part of the positive (negative) set of messages it may be decided that the message has a positive (negative) statement.

This embodiment may particularly be advantageous when processing a high number of messages. Splitting the received messages and then performing the remaining steps (deciding, extracting, calculating and storing steps) of the present method may be more efficient compared to applying the method on a message by message level upon receiving each message.

According to one embodiment, the method further comprises for each set of the positive and negative sets: identifying terms in each message of the set, creating a vocabulary comprising the identified terms, wherein each identified term is tagged as a new term or as an existing term in the knowledge base, wherein extracting the term comprises selecting a term of the vocabulary being tagged as a new term.

Having both the existing terms as well as the new terms in a vocabulary may enable an accurate scoring of the terms as described with the following embodiment. For example, if there are too many new terms compared to the existing terms, this may be an indication that the new terms may comprise fake positive or fake negative terms and may thus be scored accordingly.

According to one embodiment, the score value of the term is defined using the following formula:

$$Freq(\text{term}) * \frac{1}{N} \sum_{i}^{N} Freq(\text{term}_i) * Score(\text{term}_i),$$

where N is the number of terms in the vocabulary that are tagged as existing terms, wherein the sum is over the terms of the vocabulary that are tagged as existing terms, the Freq(t) is the frequency of term t and Score(t) is the score of term t. Freq(term) is the frequency of the term (e.g. being extracted), and Freq($\text{term}_i$) is the frequency of the term, that is an existing term present in the knowledge base. This formula may be used for calculating the score of a new positive or negative term. The sum may not be extended to all the terms in the knowledge base, but only to those of the same polarity of the new term that have been found in the vocabulary. The score is provided as proportional to the frequency of the term because the higher is the frequency, the higher is the confidence that a new negative (or positive) term is detected. This embodiment may further comprise calculating an average (e.g. a weighted average) of the scores of the existing terms (N terms of the vocabulary) that determined the identification of the new term (term) for a similarity reason. Based on the comparison between the score of the term with the calculated average the term may be stored in the knowledge based e.g. if the score is higher or equal to the calculated average the term may be stored in the knowledge base. In other terms, the score of the new term should be similar to the score of the ones that determined it.

According to one embodiment, the term is stored if the frequency is higher than a predefined threshold. This may increase the reliability of the knowledge base and thus may thus reduce the false positives or false negative rate.

According to one embodiment, the method further comprises: for each set of the positive and negative sets: identifying in each message of the set new terms that are not stored in the knowledge base, creating a set of candidates comprising the identified new terms having a frequency of occurrence higher than a predefined threshold, wherein extracting the term comprises selecting the term from the set of candidates. Having an overview of the new terms that can be added to the knowledge base may enable an improved control of storage of the new terms in the knowledge base. For example, storing on a term by term basis in the knowledge base may require evaluating the storage status before storing each term while in the present case the same evaluation may be done at once using the set of candidates.

According to one embodiment, the method further comprises repeating the extracting, calculating and the storing for each term of the set of candidates.

According to one embodiment, the term is present only in the set of candidates of the positive set or in the set of candidates of the negative set. This may prevent processing terms that belong to the two sets of candidates.

According to one embodiment, the method comprises storing the term in a first set of candidate terms having a negative sentiment if the frequency of occurrence of the term is greater than or equal to a first threshold and the term occurs in a message having a negative sentiment.

According to one embodiment, the method comprises storing the term in a second set of candidate terms having a positive sentiment if the frequency of occurrence of the term is greater than or equal to a second threshold and the term occurs in a message having a positive sentiment.

According to one embodiment, the method comprises calculating a difference set of the first set of candidate terms and the second set of candidate terms or vice versa in order to obtain a final set of terms to be added to the knowledge base. In this way the negative terms candidates that are also present with high frequency in positive messages are eliminated (this may introduce ambiguity as those terms cannot be considered as identifiers of negativity or positivity).

According to one embodiment, the method comprises: monitoring the frequency of occurrence of at least one term present in the knowledge base; and updating the score value of the term or removing the term from the knowledge base based on the monitoring. The frequency of occurrence of the term that is present in the knowledge base may be determined for predefined time period. e.g. during that time period it may be determined how often that term of the knowledge base has been used in the received messages.

During its lifetime, a term promoted as an opinion term per antonomasia can fall into disuse, becoming neutral again. Using an immutable score for the term can increase the misclassification error rate. This may be overcome by reducing the score of a term if it does not show up in messages for a long time. This to reflect the fact that the confidence in the score diminishes; or removing the term from the knowledge base if the calculated score becomes zero. This may trigger the discovering of new terms if the term will eventually become relevant again in the future.

This embodiment may be implemented by for example: defining a Lifetime parameter for a given term of the knowledge base with the meaning that the term should be removed from the knowledge base if it is not seen in any received message for Lifetime years (or other time unit). And, an attribute may be added to the given term: lastSeenTime, which is the last time the given term was identified in a message. The attribute is updated when the given term is identified in a message. Furthermore, the actual score of the term may be calculated as follows:

if($t-\text{lastSeenTime}(\text{term}))>=\text{Lifetime}$ set score=0 and remove term from the knowledge base else score(term)*log(Lifetime−($t$−lastSeenTime(term))/log(Lifetime)

where $t$ is the timestamp of the analyzing message, and score(term) is the score of the term stored in the knowledge base. The score is smoothly reduced as the term becomes less frequent in messages.

Figure 1:
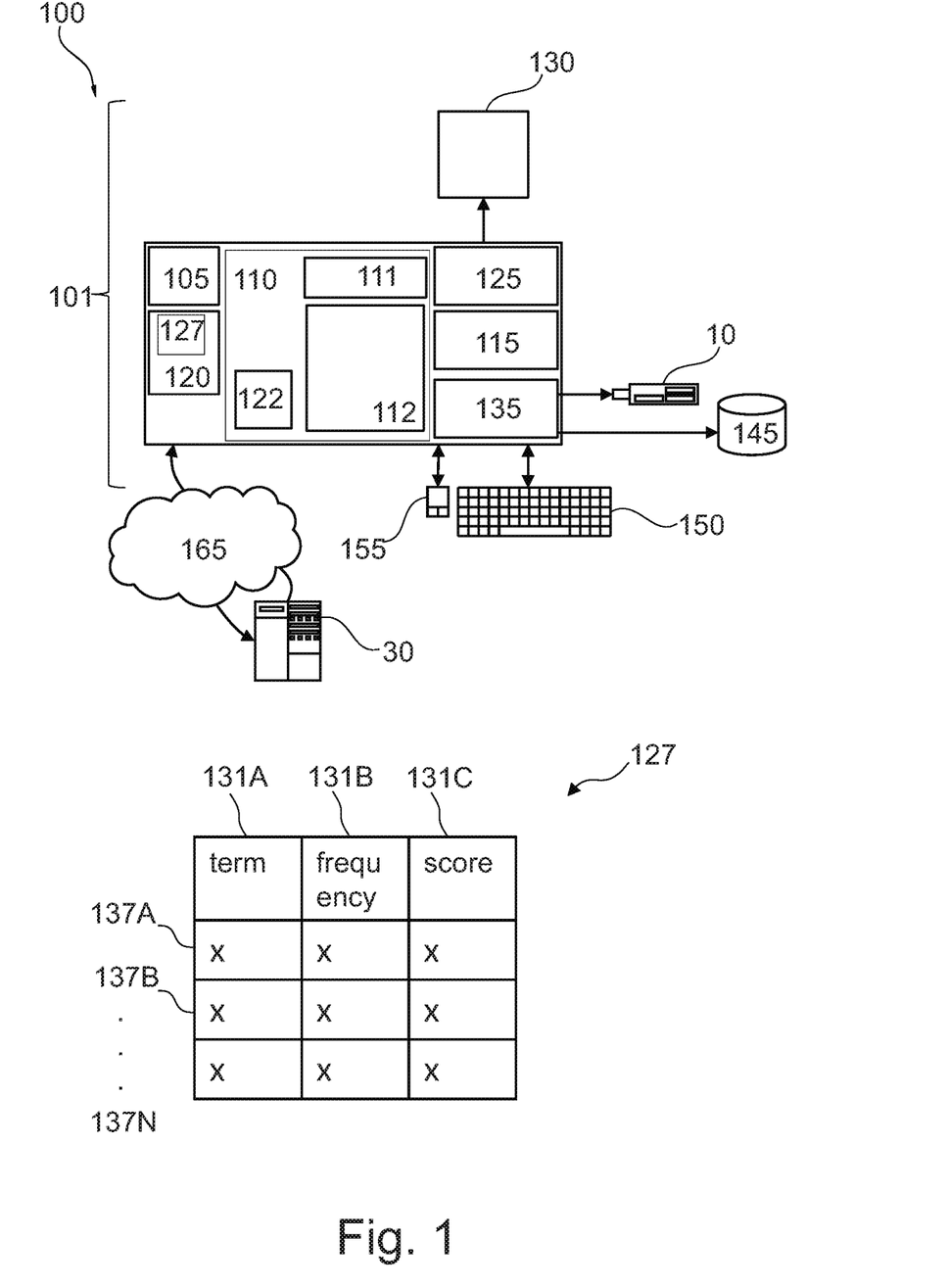
FIG. 1 represents a computerized system, suited for implementing one or more method steps as involved in the present disclosure.

FIG. 1 represents a general computerized system being a sentiment analysis system 100, suited for implementing method steps as involved in the disclosure.

It will be appreciated that the methods described herein are at least partly non-interactive and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112 e.g. instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions002E In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise a knowledge base 127. Although the knowledge base 127 is shown as part of the storage 120, the knowledge base 127 may be stored in other storages that that can be accessed by the computer 101. For example, the knowledge base 127 may be stored on the external systems 30 or I/O devices 145.

The knowledge base 127 may for example comprise a table that includes records 137A-N. The knowledge base 127 includes fields or columns for terms 131A (e.g. natural language terms), frequency of occurrence 131B of the terms 131A, score 131C associated with the terms 131A. The terms may be opinion terms.

The format of the knowledge base 127 is shown as an example; however, other formats for containing the information of the knowledge base may be used such as JSON like format, No-sql database, XML format, data format based on a Prolog language etc. The knowledge base 127 may be in a format that enables access the terms stored in the knowledge base 127.

Field 131A may comprise opinion terms. A term of the field 131A can be a single word or an idiomatic expression, or in general an n-gram. Field 131B may comprise frequency values indicating the frequency of occurrence of a term. The frequency of occurrence of a term of given message may for example be the number of messages having the same sentiment as the given message and that contain the term divided by the number of messages having the same sentiment as the given message. Field 131C may comprise scores. The score may be a positive number or a negative number where positive means that the term carries a positive sentiment and negative means that the term carries a negative sentiment. While the knowledge base 127 is shown containing attributes or fields 131B-C for each term 131A, more or less fields may be used in the knowledge base 127 in association with each term 131A.

Each record 137A-N includes values indicating a given term, the frequency of occurrence of that term and a score indicating the sentiment of the term.

Figure 2:
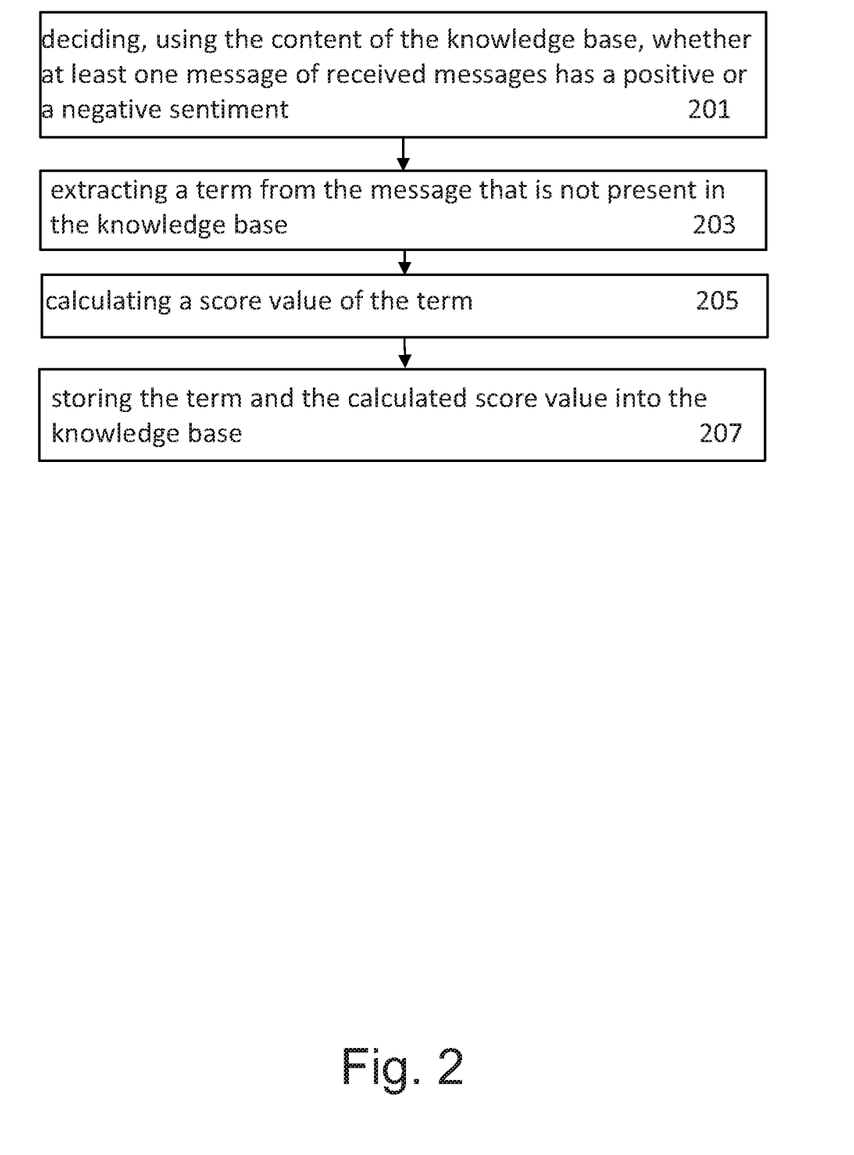
FIG. 2 is a flowchart of an example method for updating a knowledge base of a sentiment analysis system.

FIG. 2 is a flowchart of an example method for updating a knowledge base e.g. 127 of a sentiment analysis system e.g. 100. The method may have as input multiple messages comprising natural language (for clarity of the description the multiple messages are referred to as input messages). For example, the method may comprise receiving the input messages. The receiving may, for example, be performed for a predefined time period e.g. steps 201-207 may be performed upon collecting the input messages and ending of the predefined time period.

In another example, the input messages may be present in a database and the method may comprise querying the database for accessing the input messages to perform the steps 201-207.

The messages may for example be processed at real-time while the messages are posted or produced. The input messages may be processed a soon as (e.g. after the predefined time period) they are produced or generated or posted on a public social media (e.g. upon created, published or stored in a public storage the input messages are collected during the predefined time period).

A message of the input messages may for example be a twitter posting, Facebook positing, microblogging posting or a combination thereof. For example, the message may have at most 400 words. This may save processing that would otherwise be required for processing long messages.

Each message of the input messages may be time stamped, wherein the timestamp may indicate the time at which the message is posted on twitter or Facebook (e.g. the time assigned by Facebook or twitter to the posted message) or the time at which the message is received.

In step 201, it may be decided, using the content of the knowledge base 127, whether at least one message of the input messages has a positive or a negative sentiment. The at least one message may be processed using a natural language parsing tool in order to identify terms of the message. The terms identified in the message may for example be filtered such that only those terms that are language entities such as nouns, locations, dates, etc. can be processed by the present method.

For example, the at least one message may comprise all messages of the multiple messages. In other terms, each message of the input messages may be classified as positive or negative message.

In another example, the at least one message may comprise a predetermined part of the input messages. The predetermined part of the input messages may comprise a randomly selected set of one or more messages e.g. 20% of the input messages. In another example, the predetermined part of the input messages may be user defined e.g. the lastly received one or more received or posted messages.

For classifying a given message of the input messages as positive or negative message, the terms that are included in the given message and that are stored in the knowledge base 127 may be used. The scores of those terms may be used to define whether the given message is positive or negative.

For example, the scores of the terms of the knowledge base that are part of the given message may be summed up and averaged such that to determine if the given message is positive or negative message based on the resulting sum. The sum of the scores may be an algebraic sum: the score has a sign + or − depending on the polarity of the term. In another example, the number of negative terms of the given message may be compared with the number of positive terms in the given message and based on the comparison result the given message may be classified as positive or negative e.g. if the number of positive (negative) terms is higher than the number of negative (positive) terms the message may be classified as positive (negative) message.

Steps 203-207 may be performed for each message of the at least one message and each term of the each message that is not present in the knowledge base 127.

In step 203, a term may be extracted from the message that is not present in the knowledge base. For example, each term identified in the message may be compared with the terms of the knowledge base 127 and if the identified term is not present in the knowledge base 127, the identified term may be extracted from the message. The extracting of the term from the message may comprise reading the term. The reading of the term may for example be performed from the storage (e.g. a main memory) where the message is stored.

Before extracting the term from the message, the method may comprise performing a lowercase transformation of the words in the message, removing stop-words in the message and/or stemming the words of the message.

In step 205, a score value may be calculated for the extracted term based on a frequency of occurrence of the term in the input messages and the sentiment of the messages of the input messages in that the term occurs.

The score value may indicate that the extracted term is a positive or a negative term.

For example, the frequency of occurrence of the term may be the number of occurrence of the term in the messages having the same sentiment as the sentiment of the message from which the term is extracted divided by the number of messages of that same sentiment. If the term appears more than once in a single message it may be counted as occurred only once in that single message. The frequency of occurrence of the term is the number of messages in a set containing the term divided by the total number of messages in the set.

In another example, the frequency of occurrence of the term may be the number of occurrence of the term in all the input messages having divided by the number of all input messages.

The score value may be calculated using the same or different method with which the score values of the terms present in the knowledge base 127 are calculated. Using a different method for calculating the scores may enable identifying the terms that have been inserted by the present method while the scores can be used in the same manner (as the scores of the previously present terms in the knowledge base 127) to decide whether a message is positive or negative message.

In step 207, the term and the calculated score value may be stored into the knowledge base 127. For example, the term may be stored only if the frequency of the term is higher than a predefined threshold.

Figure 3:
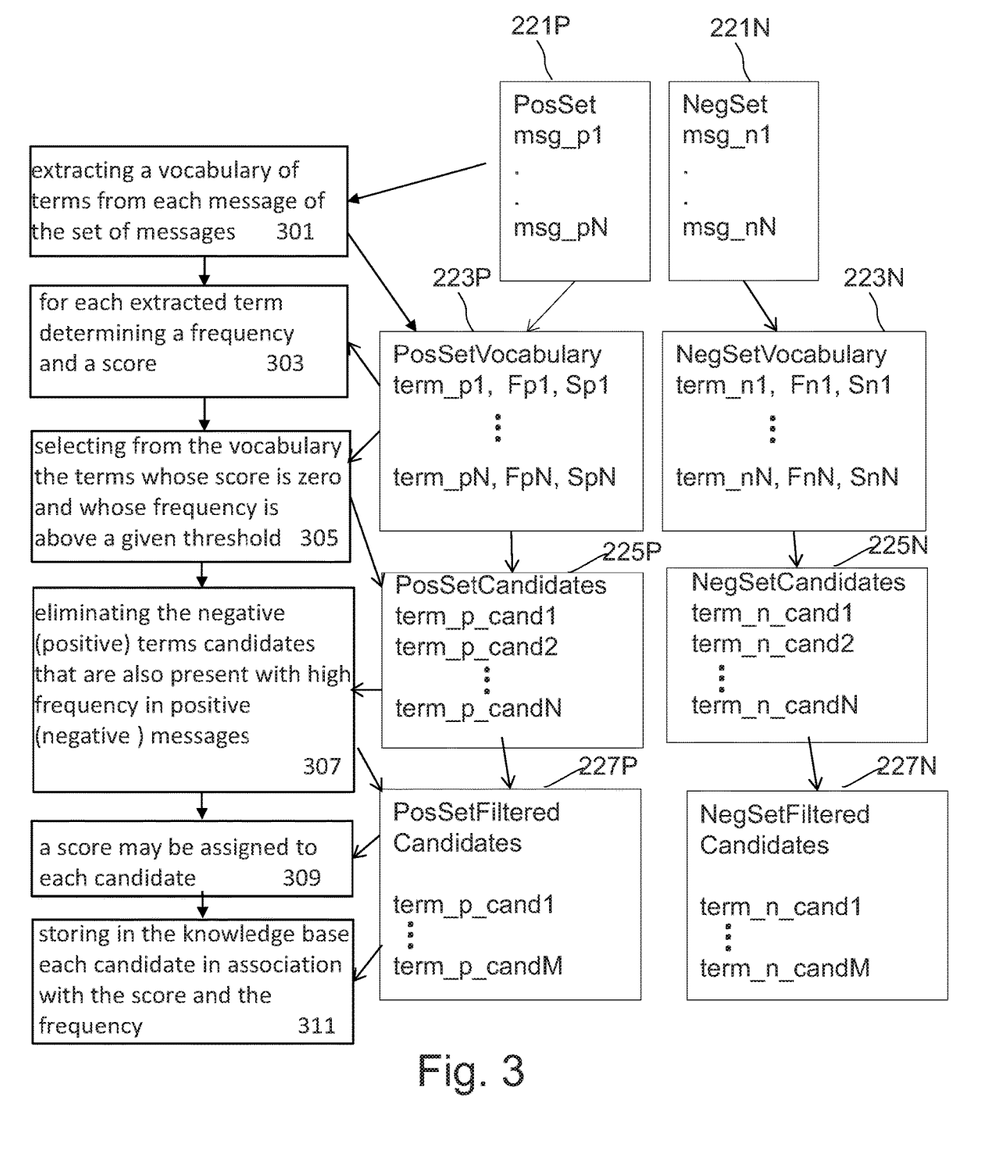
FIG. 3 is a flowchart of another example method for updating the knowledge base of the sentiment analysis system.

FIG. 3 is a flowchart of another example method for updating the knowledge base 127 of a sentiment analysis system 100. For example, messages such as tweets (or twitter posting) may be processed by the present method. The messages may for example concern a given topic (e.g. sport). Two sets of classified messages may be generated from the messages: positive (PosSet) 221P and negative (NegSet) 221N sets of messages. The classification into positive or negative message may be performed as described above. As shown in FIG. 3, PosSet 221P may comprise positive messages msg_p1-msg_pN, and NegSet 221N may comprise negative messages msg_n1-msg_nN. The number of messages in each of PosSet 221P and NegSet 221N may or may not be the same.

For each set of the sets PostSct 221P and NegSct 221N, steps 301-311 may be performed. For clarity of the description, in each of the following steps, both PostSet 221P and NegSet 221N are described; however, this does not mean that the two sets PostSet 221P and NegSet 221N have to be processed together (e.g. in parallel) in each step. For example, steps 301-305 may be processed on the PosSet 221P and NegSet 221N in parallel. In another example, steps 301-305 may be processed on the PosSet 221P first and then processed for the NegSet 221N or vice versa. For example, steps 307-311 may be processed on the PosSet 221P and NegSet 221N in parallel. In another example, steps 307-311 may be processed on the PosSet 221P first and then processed for the NegSet 221N or vice versa.

In step 301, a vocabulary NegSetVocabulary 223N of terms (term_n1-term_nN) may be extracted from each message of the set NegSet 221N. The terms may be extracted after performing a lowercase transformation of the words, removing stop-words and/or stemming the words of each message of the set NegSet 221N.

For the set PosSet 221P a vocabulary PosSetVocabulary 223P of terms (term_p1-term_pN) may be extracted from each message of the set PosSet 221N. The terms may be extracted after performing a lowercase transformation of the words, removing stop-words and/or stemming the words of each message of the set PosSet 221P.

In step 303, for each extracted term of the set NegSet 221N a frequency (Fn1-N) and a score (Sn1-N) may be determined (e.g. as attributes of the extracted term). The frequency is the number of messages in the set 221N containing the term divided by the total number of messages in the set 221N. The frequency and the score may be stored in the vocabulary 223N in association with the respective term.

For the set PosSet 221P, for each extracted term of the set PosSet 221N a frequency (Fp1-N) and a score (Sp1-N) may be determined (e.g. as attributes of the extracted term). The frequency is the number of messages in the set 221P containing the term divided by the total number of messages in the set 221P. The frequency and the score may be stored in the vocabulary 223P in association with the respective term.

If the extracted term is a term that is present in the knowledge base 127, the score may be the score stored in the knowledge base 127 in association with the term. If the extracted term is a term that is not present in the knowledge base 127 the score may be set to a predefined value (e.g. a dummy value such as zero).

The vocabulary 223N may thus comprise terms of the messages of NegSet 221N that are already in the knowledge base 127, and other terms of the messages of NegSet 221N that are not in the knowledge base 127 in association with their frequency and score.

For the set PosSet 221P, the vocabulary 223P may thus comprise terms of the messages of PosSet 221N that are already in the knowledge base 127, and other terms of the messages of PosSet 221N that are not in the knowledge base 127 in association with their frequency and score.

The number of entries (terms and associated frequencies and scores) in each of PosSetVocabulary 223P and NegSetVocabulary 223N may or may not be the same.

The present method may select terms that have a high frequency, and/or that are proper nouns, names of geographic locations, dates, etc., because they are candidate to become indicators of negativity "per antonomasia" in the future.

In step 305, the terms whose score is zero and whose frequency is above a given threshold (e.g. 70%) may be selected from the vocabulary 223N. This step may for example further comprise filtering or selecting among those selected terms only those terms that are language entities such as nouns, locations, dates, etc. This additional filter may further reduce the probability of error eliminating adjectives, adverbs, verbs, articles, prepositions, which can rarely become words used in an antonomasia figure of speech. For determining part-of-speech like verbs, nouns, dates, etc. a natural language parsing tool may be used. For example, NLP libraries like Apache OpenNLP, WordNet, etc. may be used to detect the NLP tag of the term. This step 305 may result in a set of candidates NegSetCandidates 225N comprising term candidates term_n_cand1-term_n_candN.

For the set PosSet 221P, the terms whose score is zero and whose frequency is above a given threshold (e.g. 70%) may be selected from the vocabulary 223P. This step may for example further comprise filtering or selecting among those selected terms only those terms that are language entities such as nouns, locations, dates, etc. This step may result in a set of candidates PosSetCandidates 225P comprising term candidates term_p_cand1-term_p_candN.

The number of candidates (terms) in each of PosSetCandidates 225P and NegSetCandidates 225N may or may not be the same.

In step 307, for the NegSet 221N, the set of candidates PosSetCandidates 225P may be subtracted from NegSetCandidates 225N, i.e. identify a difference, in order to eliminate the negative terms candidates that are also present with high frequency in positive messages. As those eliminated terms may introduce ambiguity, such that they cannot be considered as identifiers of negativity. In this way, the present method may provide a set of terms 227N (referred to as NegSetFilteredCandidates) that are very common in negative messages only and that are not part of the knowledge base 127.

For the PosSet 221P, the set of candidates NegSetCandidates 225N may be subtracted from PosSetCandidates 225N, in order to eliminate the positive terms candidates that are also present with high frequency in negative messages. As those eliminated terms may introduce ambiguity, such that they cannot be considered as identifiers of positivity. In this way, the present method may provide a set of terms 227P (referred to as PosSetFilteredCandidates) that are very common in positive messages only and that are not part of the knowledge base 127.

For each candidate (NegCandidate: term_n_cand1-term_n_candM) of the set of candidates NegSetFilteredCandidates 227N that result from step 307 (after the subtraction) a score may be assigned to the candidate in step 309. The score of the candidate may be defined or calculated as function of the weighted sum of the scores of the terms already present in the knowledge base 127:

$$\text{Score}(NegCandidate) = Freq(NegCandidate) * \frac{1}{N} \sum_i^N Freq(term_i) * Score(term_i)$$

where term varies in the subset of NegSetVocabulary 223N of known negative opinion terms already included in the knowledge base 127, and N is the cardinality of such subset.

For each candidate (PosCandidate: term_p_cand1-term_p_candM) of the set of candidates PosSetFilteredCandidates 227P that result from step 307 (after the subtraction) a score may be calculated and assigned to the candidate in step 309. The score of the candidate may be calculated or defined as function of the weighted sum of the scores of the terms already present in the knowledge base 127:

$$\text{Score}(PosCandidate) = Freq(PosCandidate) * \frac{1}{N} \sum_i^N Freq(term_i) * Score(term_i)$$

where term varies in the subset of PosSetVocabulary 223P of known positive opinion terms already included in the knowledge base 127, and N is the cardinality of such subset.

In step 311, the each candidate (term_n_cand1-term_n_candM, term_p_cand1-term_p_candM) may be stored in the knowledge base 127 in association with the score and the frequency of the each candidate.

The number of candidates (terms) in each of PosSetFilteredCandidates 227P and NegSetFilteredCandidates 227N may or may not be the same.

With the method described above with reference to FIG. 3, one can not only infer that a "term" is candidate to be promoted as an opinion term per antonomasia (e.g. bataclan, 9/11, un quarantotto, etc.). Also one can infer that something bad that is happening about the "term" (e.g. while streaming posts and doing realtime sentiment analysis). For example during a terrorist attack to "Bataclan" one may probably find "bataclan" as negative term and can infer that something is happening at Bataclan once it is detected that it is a point of interest.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, in a data processing apparatus comprising at least one processor and at least one memory, the at least one memory comprising instructions that are executed by the at least one processor to cause the at least one processor to be configured to implement a sentiment analysis system for updating a knowledge base of the sentiment analysis system, the knowledge base being operable for storing natural language terms and a score value related to each natural language term, the score value characterizing the sentiment of the natural language term, the method comprising:
receiving, by the sentiment analysis system, messages comprising natural language from one or more public social media systems;
deciding, by the sentiment analysis system, using content of the knowledge base, whether at least one message of the received messages has a positive sentiment or a negative sentiment;
extracting, by the sentiment analysis system, a term rom the message that is not present in the knowledge base;
based on a frequency of occurrence of the term in the received messages and the sentiment of the messages in which the term occurs, calculating, by the sentiment analysis system, a score value of the term wherein the score value of the term is defined using the following formula:

$$Freq(\text{term}) * \frac{1}{N}\sum_{i}^{N} Freq(\text{term}_i) * Score(\text{term}_i),$$

where N is a number of terms in a vocabulary tagged as existing terms, wherein the sum is over the number N of terms of the vocabulary tagged as existing terms, the Freq(t) is the frequency of term t and Score(t) is the score of term t; and
storing, by the sentiment analysis system, the term and the calculated sore value into the knowledge base.

2. The method of claim 1, further comprising:
classifying, by the sentiment analysis system, the received messages into a positive set of messages having a positive sentiment and a negative set of messages having a negative sentiment, wherein the term is extracted from the message of one of the positive set of messages or the negative set of messages and wherein the frequency of occurrence is the fraction of messages of the one of the positive set of messages and negative set of messages that contain the term.

3. The method of claim 2, further comprising:
for each set of the positive set of messages and the negative set of set messages:
identifying, by the sentiment analysis system, terms in each message of the set; and
creating, by the sentiment analysis system, a vocabulary comprising the identified terms, wherein each identified term is tagged as a new term or as an existing term in the knowledge base and wherein extracting the term comprises selecting a term of the vocabulary being tagged as a new term.

4. The method of claim 1, wherein the term is stored if the frequency is higher than a predefined threshold.

5. The method of claim 2, further comprising:
for each set of the positive setoff messages and the negative set of messages:
identifying, by the sentiment analysis system, in each message of the set new terms that are not stored in the knowledge base; and
creating, by the sentiment analysis system, a set of candidates comprising the identified new terms having a frequency of occurrence higher than a predefined threshold, wherein extracting the term comprises selecting the term from the set of candidates.

6. The method of claim 5, further comprising:
repeating, by the sentiment analysis system, the extracting, the calculating, and the storing for each term of the set of candidates.

7. The method of claim 5, wherein the term is present only in the set of candidates of the positive set or in the set of candidates of the negative set.

8. The method of claim 1, further comprising:
storing, by the sentiment analysis system, the term in a first set of candidate terms having a negative sentiment if the frequency of occurrence of the term is greater than or equal to a first threshold and the term occurs in a message having a negative sentiment.

9. The method of claim 1, further comprising:
storing, by the sentiment analysis system, the term in a second set of candidate terms having a positive sentiment if the frequency of occurrence of the term is greater than or equal to a second threshold and the term occurs in a message having a positive sentiment.

10. The method of claim 9, further comprising:
calculating, by the sentiment analysis system, a difference set of a first set of candidate terms and a second set of candidate terms in order to obtain a final set of terms to be added to the knowledge base.

11. The method of claim 1, further comprising:
monitoring, by the sentiment analysis system, the frequency of occurrence of at least one term present in the knowledge base; and
updating, by the sentiment analysis system, the score value of the term or removing the term from the knowledge base based on the monitoring.

12. A computer program product comprising a computer readable storage medium having a computer readable program stored therein, wherein the computer readable storage medium is not a transitory signal per se, and wherein the computer readable program, when executed on a computing device, causes the computing device to implement a sentiment analysis system for updating a knowledge base of the sentiment analysis system, the knowledge base being operable for storing natural language terms and a score value related to each natural language term, the score value characterizing the sentiment of the natural language term, and further causes the computing device to:
receive, by the sentiment analysis system, messages comprising natural language from one or more public social media systems;

decide, by the sentiment analysis system, using content of a knowledge base, whether at least one message of the received messages has a positive sentiment or a negative sentiment;

extract, by the sentiment analysis system, a term from the message that is not present in the knowledge base;

based on a frequency of occurrence of the term in the received messages and the sentiment of the messages in which the term occurs, calculate, by the sentiment analysis system, a score value of the term wherein the score value of the term is defined using the following formula:

$$Freq(\text{term}) * \frac{1}{N} \sum_{i}^{N} Freq(\text{term}_i) * Score(\text{term}_i),$$

where N is a number of terms in a vocabulary tagged as existing terms, wherein the sum is over the number N of terms of the vocabulary tagged as existing terms, the Freq(t) is the frequency of term t and Score(t) is the score of term t; and store, by the sentiment analysis system, the term and the calculated score value into the knowledge base.

13. The computer program product of claim 12, wherein the computer readable program further causes the computing device to:

classify, by the sentiment analysis system, the received messages into a positive set of messages having a positive sentiment and a negative set of messages having a negative sentiment, wherein the term is extracted from the message of one of the positive set of messages or the negative set of messages and wherein the frequency of occurrence is the fraction of messages of the one of the positive set of messages and negative set of messages that contain the term.

14. The computer program product of claim 13, wherein computer readable program further causes the computing device to:

for each set of the positive set of message and the negative messages:
identify, the sentiment analysis system, term in each message of the set and
create, by the sentiment analysis system, a vocabulary comprising the identified terms, wherein each identified term is tagged as a new term or as an existing term in the knowledge base and wherein extracting the term comprises selecting a term of the vocabulary being tagged as a new term.

15. An apparatus comprising;
a processor; and
a memory coupled to the processor, wherein the memory comprises instructions which, when executed by the processor, cause the processor to implement a sentiment analysis system for updating a knowledge base of the sentiment analysis system, the knowledge base being operable for storing natural language terms and a score value related to each natural language term, the score value characterizing the sentiment of the natural language term, and further causes the processor to;

receive, by the sentiment analysis system, multiple messages comprising natural language from one or more public social media systems;

decide, by the sentiment analysis system, using the content of a knowledge base, whether at least one message of the received messages has a positive or a negative sentiment;

extract, by the sentiment analysis system, a term from the message that is not present in the knowledge base;

based on a frequency of occurrence of the term in the messages and the sentiment of the messages in that the term occurs, calculate, by the sentiment analysis system, a score value of the term wherein the score value of the term is defined using the following formula:

$$Freq(\text{term}) * \frac{1}{N} \sum_{i}^{N} Freq(\text{term}_i) * Score(\text{term}_i),$$

where N is a number of terms in a vocabulary tagged as existing terms, wherein the sum is over the number N of terms of the vocabulary tagged as existing terms, the Freq(t) is the frequency of term t and Score(t) is the score of term; and store, by the sentiment analysis system, the term and t e calculated score value into the knowledge base.

16. The apparatus of claim 15, wherein tine instructions further cause the processor to:

classify, by the sentiment analysis system the received messages into a positive set of messages having a positive sentiment and a negative set of messages having a negative sentiment, wherein the term is extracted from the message of one of the positive set of messages or the negative set of messages and wherein the frequency of occurrence is the fraction of messages of the one of the positive set of messages and negative set of messages that contain the term.

17. The apparatus of claim 16, wherein the instructions further cause the processor to:

for each set of the positive set of messages and the negative set of set messages;
identify, by the sentiment analysis system, terms in each message of the set; and
create, by the sentiment analysis system, a vocabulary comprising the identified terms, wherein each identified term is tagged as a new term or as an existing term in the, knowledge base and wherein extracting the term comprises selecting a term of the vocabulary being tagged as a new term.

* * * * *